US012563120B2

(12) United States Patent
Hyun et al.

(10) Patent No.: US 12,563,120 B2
(45) Date of Patent: Feb. 24, 2026

(54) METHOD AND SYSTEM FOR CONTROLLING INTEROPERABILITY ARCHITECTURE FOR CROSS-PLATFORM METAVERSE

(71) Applicant: Electronics and Telecommunications Research Institute, Daejeon (KR)

(72) Inventors: Wook Hyun, Daejeon (KR); Mi Young Huh, Daejeon (KR); Jung Ha Hong, Daejeon (KR); Shin Gak Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/748,390

(22) Filed: Jun. 20, 2024

(65) Prior Publication Data

US 2025/0007986 A1     Jan. 2, 2025

(30) Foreign Application Priority Data

| | | |
|---|---|---|
| Jun. 27, 2023 | (KR) | ........................ 10-2023-0082355 |
| Aug. 31, 2023 | (KR) | ........................ 10-2023-0115641 |
| Feb. 19, 2024 | (KR) | ........................ 10-2024-0023693 |
| Mar. 22, 2024 | (KR) | ........................ 10-2024-0040012 |
| Apr. 4, 2024 | (KR) | ........................ 10-2024-0046244 |

(51) Int. Cl.
| | |
|---|---|
| *G06F 15/16* | (2006.01) |
| *H04L 9/40* | (2022.01) |
| *H04L 67/131* | (2022.01) |
| *H04L 67/141* | (2022.01) |

(52) U.S. Cl.
CPC ........ *H04L 67/131* (2022.05); *H04L 63/0428* (2013.01); *H04L 67/141* (2013.01)

(58) Field of Classification Search
CPC .. H04L 63/0428; H04L 67/131; H04L 67/141
USPC ......................................................... 709/201
See application file for complete search history.

(56) References Cited

U.S. PATENT DOCUMENTS

| | | | |
|---|---|---|---|
| 6,370,138 | B1 | 4/2002 | Kim et al. |
| 7,991,706 | B2 * | 8/2011 | Mattern ................. G06Q 50/60 |
| | | | 705/401 |
| 9,769,131 | B1 * | 9/2017 | Hartley ............... H04W 12/033 |
| 10,015,196 | B1 * | 7/2018 | Hartley ............... H04L 63/0428 |
| 10,262,631 | B1 * | 4/2019 | St-Pierre .............. H04L 67/131 |
| 10,430,147 | B2 * | 10/2019 | Vembar ................. G06F 3/1454 |
| 10,609,076 | B1 * | 3/2020 | Hartley .................. G06F 21/53 |
| 10,740,804 | B2 * | 8/2020 | Spivack ............. G06F 3/04815 |

(Continued)

FOREIGN PATENT DOCUMENTS

| | | |
|---|---|---|
| KR | 10-2425479 B1 | 7/2022 |
| KR | 10-2470154 B1 | 11/2022 |
| KR | 10-2023-0075345 A | 5/2023 |

OTHER PUBLICATIONS

Gong, "Project JXTA: A Technology Overview", Sun Microsystems, Inc., Apr. 25, 2001, pp. 1-11 (12 pages total).

*Primary Examiner* — Moustafa M Meky

(74) *Attorney, Agent, or Firm* — Sughrue Mion, PLLC

(57) ABSTRACT

A method and system for controlling an interoperability architecture for a cross-platform metaverse are disclosed. According to an embodiment of the present disclosure, a method and system for controlling the architecture that manages the interaction and major components of the metaverse platform are provided.

19 Claims, 10 Drawing Sheets

(56) References Cited

U.S. PATENT DOCUMENTS

| | | | | |
|---|---|---|---|---|
| 11,481,039 | B2 | 10/2022 | Choi et al. | |
| 11,520,555 | B2 * | 12/2022 | Vembar | G06F 3/147 |
| 11,527,171 | B2 * | 12/2022 | Freiwirth | G06T 19/006 |
| 11,599,626 | B1 * | 3/2023 | Hartley | H04L 63/105 |
| 12,307,003 | B2 * | 5/2025 | Soryal | G06F 3/011 |
| 12,322,301 | B2 * | 6/2025 | Freiwirth | H04L 67/131 |
| 2008/0155019 | A1 * | 6/2008 | Wallace | A63F 13/30 |
| | | | | 709/204 |
| 2008/0313105 | A1 * | 12/2008 | Mattern | G06Q 50/60 |
| | | | | 705/410 |
| 2009/0276718 | A1 | 11/2009 | Dawson et al. | |
| 2018/0232937 | A1 * | 8/2018 | Moyer | G06T 15/005 |
| 2018/0300098 | A1 * | 10/2018 | Vembar | G06F 3/147 |
| 2019/0065028 | A1 * | 2/2019 | Chashchin-Semenov | |
| | | | | G06F 3/011 |
| 2020/0294097 | A1 * | 9/2020 | Spivack | G06F 3/04883 |
| 2020/0335001 | A1 * | 10/2020 | Freiwirth | A63F 13/65 |
| 2021/0294560 | A1 * | 9/2021 | Vembar | G06F 3/147 |
| 2023/0216682 | A1 | 7/2023 | Lipton et al. | |
| 2023/0319144 | A1 * | 10/2023 | Smith | G06F 3/04815 |
| | | | | 463/42 |
| 2024/0039926 | A1 * | 2/2024 | Gupta | H04L 67/131 |
| 2024/0160272 | A1 * | 5/2024 | Soryal | G06F 3/011 |
| 2025/0244824 | A1 * | 7/2025 | Soryal | H04L 67/131 |

* cited by examiner

Functional Architecture (b)

Functional Component (c)

Functions (d)

Functional Entity

METHOD AND SYSTEM FOR CONTROLLING INTEROPERABILITY ARCHITECTURE FOR CROSS-PLATFORM METAVERSE

CROSS-REFERENCE TO RELATED APPLICATIONS

This application claims the benefit of earlier filing date and right of priority to Korean Application No. 10-2023-0082355, filed on Jun. 27, 2023, Korean Application No. 10-2023-011564, filed on Aug. 31, 2023, Korean Application No. 10-2024-0023693, filed on Feb. 19, 2024, Korean Application No. 10-2024-0040012, filed on Mar. 22, 2024, Korean Application No. 10-2024-0046244, filed on Apr. 4, 2024, the contents of which are all hereby incorporated by reference herein in their entirety.

TECHNICAL FIELD

The present disclosure relates to metaverse technology, and more specifically, to a method and system for controlling interoperability architecture for a cross platform metaverse.

BACKGROUND

Metaverse is a compound word of "meta," meaning virtual or application, and "universe," meaning universe, and refers to a virtual world where various social, economic, and cultural activities like the real world take place.

Recently, as the development and demand for technologies utilizing information and communication technologies and virtual reality (VR)/augmented reality (AR) have rapidly increased, the development and demand for metaverse-related technologies that combine these are also rapidly increasing.

Accordingly, the number of metaverse platforms, which are three-dimensional virtual worlds where users can perform various operations and communicate, is increasing. Meanwhile, since individual metaverse platforms operate based on their own protocols, there is a problem that various functions are incompatible between metaverse platforms.

SUMMARY

The present disclosure is intended to solve the above-mentioned problems, and the technical problem of the present disclosure is to provide a method and system for controlling the interoperability architecture for a cross-platform metaverse.

The technical problem of the present disclosure is to provide a method and system for controlling the architecture that manages the interaction and major components of the metaverse platform.

The technical problem of the present disclosure is to provide a reference point that increases interoperability between metaverse platforms and a method and system for controlling information flow.

The technical problems to be achieved in the present disclosure are not limited to the technical tasks mentioned above, and other technical problems not mentioned will be clearly understood by those skilled in the art from the description below.

According to an embodiment of the present disclosure, A method of controlling a interoperability architecture for the cross-platform metaverse may include receiving, by a first metaverse platform, first manifesto information of a second metaverse platform from a second metaverse platform; identifying, by the first metaverse platform, interoperability between the first metaverse platform and the second metaverse platform based on second manifesto information of the first metaverse platform and the first manifesto information; based on identifying that support of a metaverse bridge is needed for interoperability between the first metaverse platform and the second metaverse platform, transmitting, by the first metaverse platform, the first manifesto information and the second manifesto information to the metaverse bridge; transmitting, by the metaverse bridge, third manifesto information related to a virtual bridge to the first metaverse platform; establishing, by the first metaverse, the virtual bridge connection with the metaverse bridge and transmitting the first manifesto information and the third manifesto information to the second metaverse platform; and establishing, by the second metaverse platform, the virtual bridge connection with the metaverse bridge based on at least one of the first manifesto information and the third manifesto information.

In addition, by the first metaverse platform, at least one function capable of direct connection between the first metaverse platform and the second metaverse platform and at least one function not capable of direct connection may be identified, information related to the at least one function not capable of direction connection among the first manifesto information and the second manifesto information may be transmitted to the metaverse bridge by the first metaverse platform, and information related to the at least one function capable of direct connection among the first manifesto information and the second manifesto information may be transmitted from the first metaverse platform to the second metaverse platform, and a direct connection interface may be established by the second metaverse platform based on information related to the at least one function capable of direct connection.

In addition, the generating the virtual bridge may include generating at least one converting engine for interconnection between the first metaverse platform and the second metaverse platform; and transmitting information on a specific converting engine among the at least one converting engine to the first metaverse platform.

In addition, by the first metaverse platform, a first request signal requesting connection setup of the virtual bridge may be transmitted to the metaverse bridge based on the information on the specific converting engine, and by the metaverse bridge, the third manifesto information is transmitted to the first metaverse platform according to the first request signal.

In addition, the third manifesto information includes information on an address, connection method, and protocol required for the second metaverse platform to access the virtual bridge, and the information on the address, connection method, and protocol required to access the virtual bridge may be encrypted based on a public key of the second metaverse platform.

In addition, the establishing the virtual bridge connection with the metaverse bridge by the second metaverse platform may comprise decrypting the information on the address, connection method, and protocol required to access the virtual bridge; establishing the virtual bridge connection through the information on the address, connection method, and protocol required to access the decrypted virtual bridge; and receiving a virtual bridge connection setup result from the metaverse bridge.

In addition, the information related to at least one function not capable of direct connection may be exchanged between the first metaverse platform and the second metaverse platform through the virtual bridge.

In addition, the first manifesto information may include at least one of information related to the second metaverse platform and information on at least one function supported by the second metaverse platform, the second manifesto information may include at least one of information related to the first metaverse platform and information about at least one function supported by the first metaverse platform, and the information on the at least one function supported by each of the first metaverse platform and the second metaverse platform may include protocols and authentication information related to the at least one function supported by each of the first metaverse platform and the second metaverse platform.

In addition, the at least one function supported by each of the first metaverse platform and the second metaverse platform may include at least one of an avatar-related function, an asset-related function, a content-related function, or an identity-related function.

According to an embodiment of present disclosure, a system that controls interoperability architecture for cross-platform metaverse may include a first metaverse platform; a second metaverse platform; and a metaverse bridge, and the first metaverse platform may be configured to: receive first manifesto information of a second metaverse platform from a second metaverse platform; identify interoperability between the first metaverse platform and the second metaverse platform based on the second manifesto information of the first metaverse platform and the first manifesto information; based on identifying that support of a metaverse bridge is needed for interoperability between the first metaverse platform and the second metaverse platform, transmit the first manifesto information and the second manifesto information to the metaverse bridge; and receive, from the metaverse bridge, third manifesto information related to a virtual bridge; and establish a virtual bridge connection with the metaverse bridge and transmit the first manifesto information and third information to the second metaverse platform, and the second metaverse platform is configured to establish the virtual bridge connection with the metaverse bridge based on at least one of the first manifesto information and the third manifesto information.

In addition, the metaverse bridge may be configured to: generate at least one converting engine for interconnection between the first metaverse platform and the second metaverse platform; and transmit information on a specific converting engine among the at least one converting engine to the first metaverse platform.

In addition, the second metaverse platform may be configure to: decrypt the information on the address, connection method, and protocol required to access the virtual bridge; establish the virtual bridge connection through the information on the address, connection method, and protocol required to access the decrypted virtual bridge; and receive the virtual bridge connection setup result from the metaverse bridge.

In one embodiment of the present disclosure, a first metaverse platform included in a interoperability architecture for cross-platform metaverse, the first metaverse platform may include at least one memory; and at least one processor, and the at least one processor may be configured to: receive first manifesto information of a second metaverse platform from a second metaverse platform; identify interoperability between the first metaverse platform and the second metaverse platform based on second manifesto information of the first metaverse platform and the first manifesto information; based on identifying that support of a metaverse bridge is needed for interoperability between the first metaverse platform and the second metaverse platform, transmit, by the metaverse bridge, third manifesto information related to a virtual bridge to the first metaverse platform; establish the virtual bridge connection with the metaverse bridge and transmit the first manifesto information and the third manifesto information to the second metaverse platform.

In one embodiment of the present disclosure, in at least one non-transitory computer-readable medium storing at least one instruction, the at least one instruction executable by at least one processor may control a interoperability architecture for the cross-platform metaverse to: receive first manifesto information of a second metaverse platform from a second metaverse platform; identify interoperability between the first metaverse platform and the second metaverse platform based on second manifesto information of the first metaverse platform and the first manifesto information; based on identifying that support of a metaverse bridge is needed for interoperability between the first metaverse platform and the second metaverse platform, transmit the first metaverse platform, the first manifesto information and the second manifesto information to the metaverse bridge; and set up the virtual bridge connection and transmitting information related to the virtual bridge setup to the second metaverse platform, and the metaverse bridge connection may be set up based on information on the virtual bridge.

The features briefly summarized above with respect to the present disclosure are merely exemplary aspects of the detailed description of the present disclosure described below and do not limit the scope of the present disclosure.

According to various embodiments of the present disclosure, a method and system for controlling an interoperability architecture for a cross-platform metaverse may be provided.

According to various embodiments of the present disclosure, a method and system for controlling the architecture that manages the interaction and main components of the metaverse platform may be provided.

According to various embodiments of the present disclosure, a method and system for controlling a reference point and information flow that increases interoperability between metaverse platforms may be provided.

The effects obtainable in the present disclosure are not limited to the effects mentioned above, and other effects not mentioned will be clearly understood by those skilled in the art from the description below.

BRIEF DESCRIPTION OF THE DRAWINGS

The accompanying drawings included as part of the detailed description to facilitate understanding of the present disclosure provide embodiments of the present disclosure and describe technical features of the present disclosure along with detailed descriptions.

FIG. 1 shows symbols that describe functional components, functions, and functional entities that may be applied to the present disclosure.

DETAILED DESCRIPTION

Figure 2:
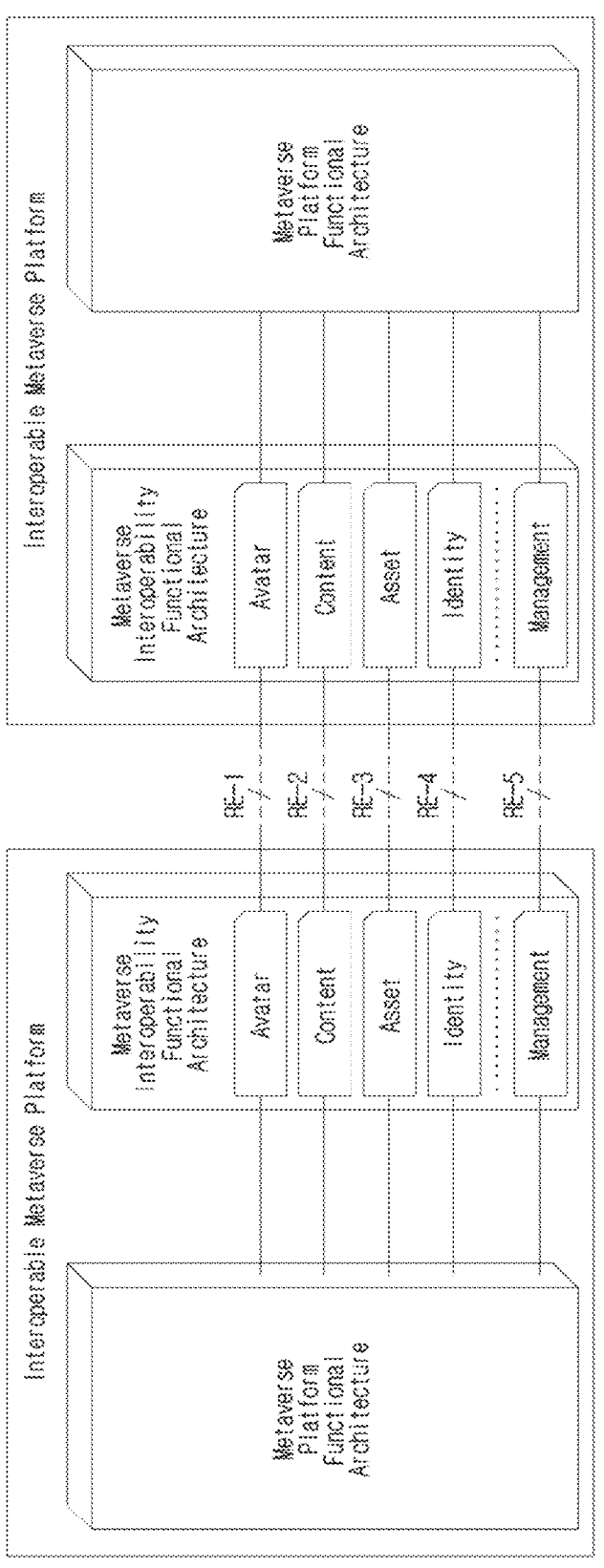
FIG. 2 shows the architecture of Metaverse cross-platform interoperability, according to one embodiment of the present disclosure.

Since the present disclosure can make various changes and have various embodiments, specific embodiments are illustrated in the drawings and described in detail in the detailed description. However, this is not intended to limit the present disclosure to specific embodiments, and should be understood to include all modifications, equivalents, and substitutes included in the idea and scope of the present disclosure. Similar reference numbers in the drawings indicate the same or similar function throughout the various aspects. The shapes and sizes of elements in the drawings may be exaggerated for clarity. Detailed description of exemplary embodiments to be described later refers to the accompanying drawings, which illustrate specific embodiments by way of example. These embodiments are described in sufficient detail to enable those skilled in the art to practice the embodiments. It should be understood that the various embodiments are different, but need not be mutually exclusive. For example, specific shapes, structures, and characteristics described herein may be implemented in another embodiment without departing from the idea and scope of the present disclosure in connection with one embodiment. Additionally, it should be understood that the location or arrangement of individual components within each disclosed embodiment may be changed without departing from the spirit and scope of the embodiment. Accordingly, the detailed description set forth below is not to be taken in a limiting sense, and the scope of the exemplary embodiments, if properly described, is limited only by the appended claims, along with all equivalents as claimed by those claims.

In this disclosure, terms such as first and second may be used to describe various components, but the components should not be limited by the terms. These terms are only used for the purpose of distinguishing one component from another. For example, a first element may be termed a second element, and similarly, a second element may be termed a first element, without departing from the scope of the present disclosure. The term and/or includes a combination of a plurality of related recited items or any one of a plurality of related recited items.

When an element of the present disclosure is referred to as being "connected" or "connected" to another element, it may be directly connected or connected to the other element, but it should be understood that other components may exist in the middle. On the other hand, when an element is referred to as "directly connected" or "directly connected" to another element, it should be understood that no other element exists in the middle.

Components appearing in the embodiments of the present disclosure are shown independently to represent different characteristic functions, and do not mean that each component is composed of separate hardware or a single software component. That is, each component is listed and included as each component for convenience of description, and at least two components of each component are combined to form one component, or one component can be divided into a plurality of components to perform functions. An integrated embodiment and a separate embodiment of each of these components are also included in the scope of the present disclosure unless departing from the essence of the present disclosure.

Terms used in the present disclosure are only used to describe specific embodiments, and are not intended to limit the present disclosure. Singular expressions include plural expressions unless the context clearly dictates otherwise. In the present disclosure, terms such as "comprise" or "have" are intended to designate that there are features, numbers, steps, operations, components, parts, or combinations thereof described in the specification, and it should be understood that this does not preclude the possibility of the presence or addition of one or more other features, numbers, steps, operations, components, parts, or combinations thereof. That is, the description of "including" a specific configuration in the present disclosure does not exclude configurations other than the corresponding configuration, and means that additional configurations may be included in the practice of the present disclosure or the scope of the technical spirit of the present disclosure.

Some of the components of the present disclosure may be optional components for improving performance rather than essential components that perform essential functions in the present disclosure. The present disclosure may be implemented including only components essential to implement the essence of the present disclosure, excluding components used for performance improvement, and a structure including only essential components excluding optional components used only for performance improvement is also included in the scope of the present disclosure.

Hereinafter, embodiments of the present disclosure will be described in detail with reference to the drawings. In describing the embodiments of this specification, if it is determined that a detailed description of a related known configuration or function may obscure the gist of the present specification, the detailed description will be omitted. The same reference numerals are used for the same components in the drawings, and redundant descriptions of the same components are omitted.

The system and/or method/device (hereinafter simply expressed as 'system') proposed in this disclosure relates to a method and system for controlling an interoperability architecture for a cross-platform metaverse.

As described above, currently, there are numerous Metaverse platforms around the world, but there is a problem that there is no interoperability capability between Metaverse platforms in terms of avatar, asset, content, and identity interoperability.

In order to provide interoperability between these metaverse cross-platforms, an interoperability architecture for the metaverse cross-platform is needed for common understanding among stakeholders.

Hereinafter, a method and system for controlling the architecture to provide interoperability between metaverse cross platforms will be described.

In describing the present disclosure, "Entity" may include users, internet of things (IoT) devices, robots, digital humans, artificial intelligence (AI), system components, etc.

"Avatar" may refer to a digital entity that can be used as a (visual) representation of a user within a virtual environment.

Figure 1:
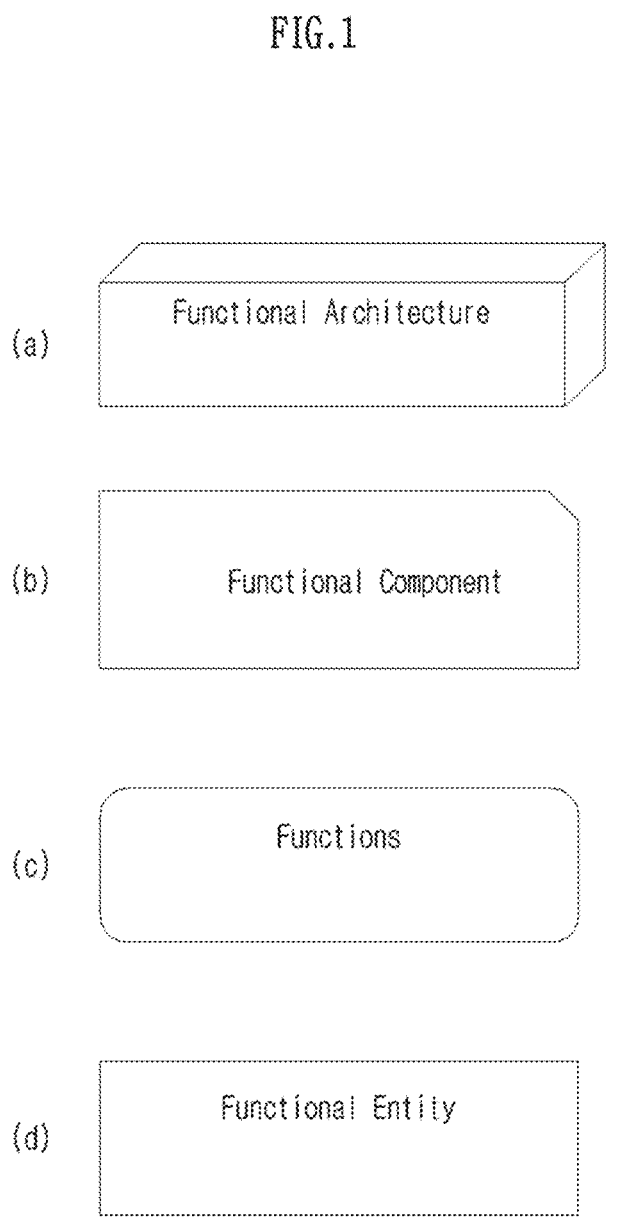

"Functional architecture" is defined as a set of functional components and can be expressed with a symbol such as (a) in FIG. 1.

"Functional component" is defined as a collection of functions and may be expressed as a symbol such as (b) in FIG. 1.

"Function" is defined as a collection of functions and can be expressed by a symbol such as (c) in FIG. 1.

"Functional Entity" is defined as a group of functionalities that has not been further subdivided at the level of detail described, and may be represented by a symbol such as (d) in FIG. 1.

However, this is only one embodiment, and the interoperability architecture for the cross-platform metaverse described in this disclosure may be subdivided into various functional blocks.

Additionally, in describing the present disclosure, "Metaverse platform" may collectively refer to a platform management device and/or server that manages and controls a specific virtual world. In other words, the Metaverse platform may consist of one or more devices and/or servers.

"Metaverse Bridge" may collectively refer to a device and/or server that manages and controls a virtual bridge for interoperation between multiple Metaverse platforms. That is, the metaverse bridge may be composed of one or more devices and/or servers.

Also, "manifesto file" or "manifesto information" may collectively refer to files or information that define various settings and configurations for linking the metaverse platform.

Here, the manifesto file or manifesto information may be used to increase compatibility with other metaverse platforms by defining the basic protocols, supported content formats, and functions of the metaverse platform. Each item that makes up the manifesto file/information may be expanded with additional details.

Additionally, the manifesto file or manifesto information may include key information about the metaverse platform, supported protocols and content formats, characteristic functions, and information about interoperability with other metaverse platforms.

As an example, manifesto file or manifesto information may include at least one of manifesto specifications (e.g., version information), (metaverse) platform information, virtual bridge information, identity information, asset information, avatar information, and content information.

For example, the platform information may include at least one of the platform name, version, identifier, manifesto uniform resource locator (URL), or public key.

The virtual bridge information may include at least one of a virtual bridge name, virtual bridge version, virtual bridge manifesto URL, or virtual bridge identifier.

Identity information may include protocols (e.g., identity authentication and migration protocols or/and protocol specific parameters) and authentication methods.

Asset information may include the protocol (e.g., asset transfer and exchange protocols, protocol specific parameters) and type of supported asset (e.g., non-fungible token (NFT), chain, digital currency, compatible wallet).

The avatar information may include at least one of a protocol (e.g., avatar exchange, migration and synchronization protocol, protocol specific parameters), 3D motel interaction, synchronization (minimum-interval), and default avatar.

Content information may include protocol (e.g., protocol name, version, specific parameters), file format (e.g., supported file types (e.g., 3D, image, video, etc.)), format specific parameters, rendering parameters, etc.

In other words, each Metaverse platform may ensure interconnection by exchanging manifesto information/files about protocols, messages, requirements, etc. related to various interconnection elements. Hereinafter, a technology for securing an interconnection channel using the Metaverse Bridge for functions that cannot be interconnected between Metaverse platforms will be described.

FIG. 2 illustrates the interoperability architecture of a cross-platform metaverse, according to one embodiment of the present disclosure.

The cross-platform Metaverse's interoperability architecture may handle seamless integration and collaboration in various Metaverse environments. Through the cross-platform Metaverse's interoperability architecture, users can seamlessly explore and interact with various virtual worlds and receive an integrated and interconnected Metaverse experience.

The cross-platform Metaverse's interoperability architecture facilitates the transfer of avatars, assets, and user data across Metaverse platforms, allowing users to maintain a consistent identity and experience.

As an example of the present disclosure, as shown in FIG. 2, the metaverse platform may interact with other platforms using standardized protocols. As an example, each metaverse platform may exchange avatars, content, assets, identity information, and platform information through IMFC (interoperability management functional component).

An interoperable metaverse platform may not require a reference point because it includes both the Metaverse Platform Functional Architecture (MPFA) and the Metaverse Interoperability Functional Architecture (MIFA).

Figure 3:
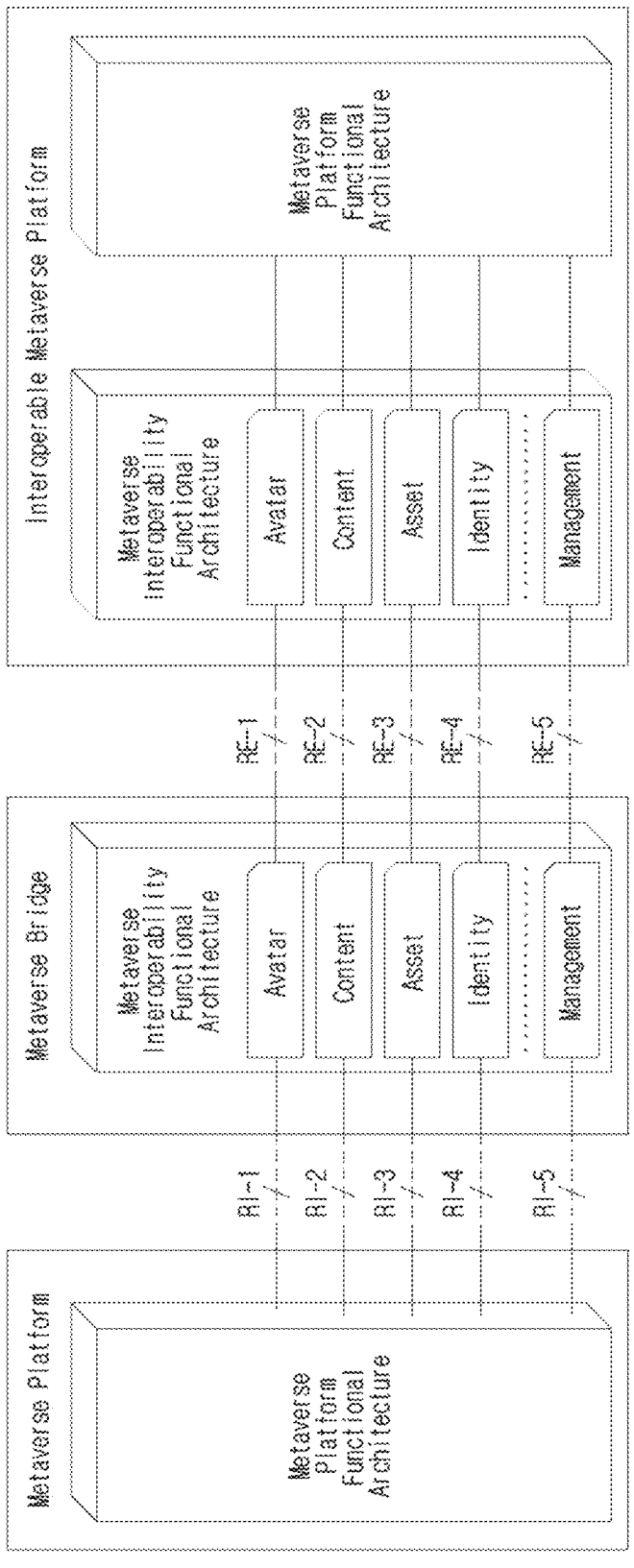
FIG. 3 shows the interoperability architecture of a cross-platform metaverse, according to one embodiment of the present disclosure.

As another example of the present disclosure, FIG. 3 illustrates the interoperability architecture of a cross-platform metaverse, according to an embodiment of the present disclosure.

Specifically, as shown in FIG. 3, the metaverse platform may interact with other platforms using a metaverse bridge.

A metaverse bridge (or virtual bridge) may enable connectivity and interoperability between different metaverse platforms. As an example, the Metaverse bridge may perform the function/operation of exchanging and moving user information, asset information, and ID information between Metaverse platforms.

The Metaverse Bridge may be implemented as a component of a specific Metaverse platform, but is not limited thereto. As shown in FIG. 3, the Metaverse Bridge may operate independently/separately as a third-party service provider.

In this way, if the Metaverse bridge is implemented independently of the Metaverse platform, companies providing Metaverse bridge services may quickly develop new functions and various additional services based on their competitiveness.

High-Level Interoperability Functional Architecture for Cross-Platform Metaverse Hereinafter, the high-level interoperability functional architecture for the cross-platform metaverse and related components to ensure interoperability with different metaverse platforms are described.

The high-level interoperability functional architecture for the cross-platform metaverse may include a metaverse bridge and an interoperable metaverse platform model.

However, depending on the interoperability model, each component of MIFA may interact with other metaverse platforms through RI reference points or RE reference points.

Figure 4:
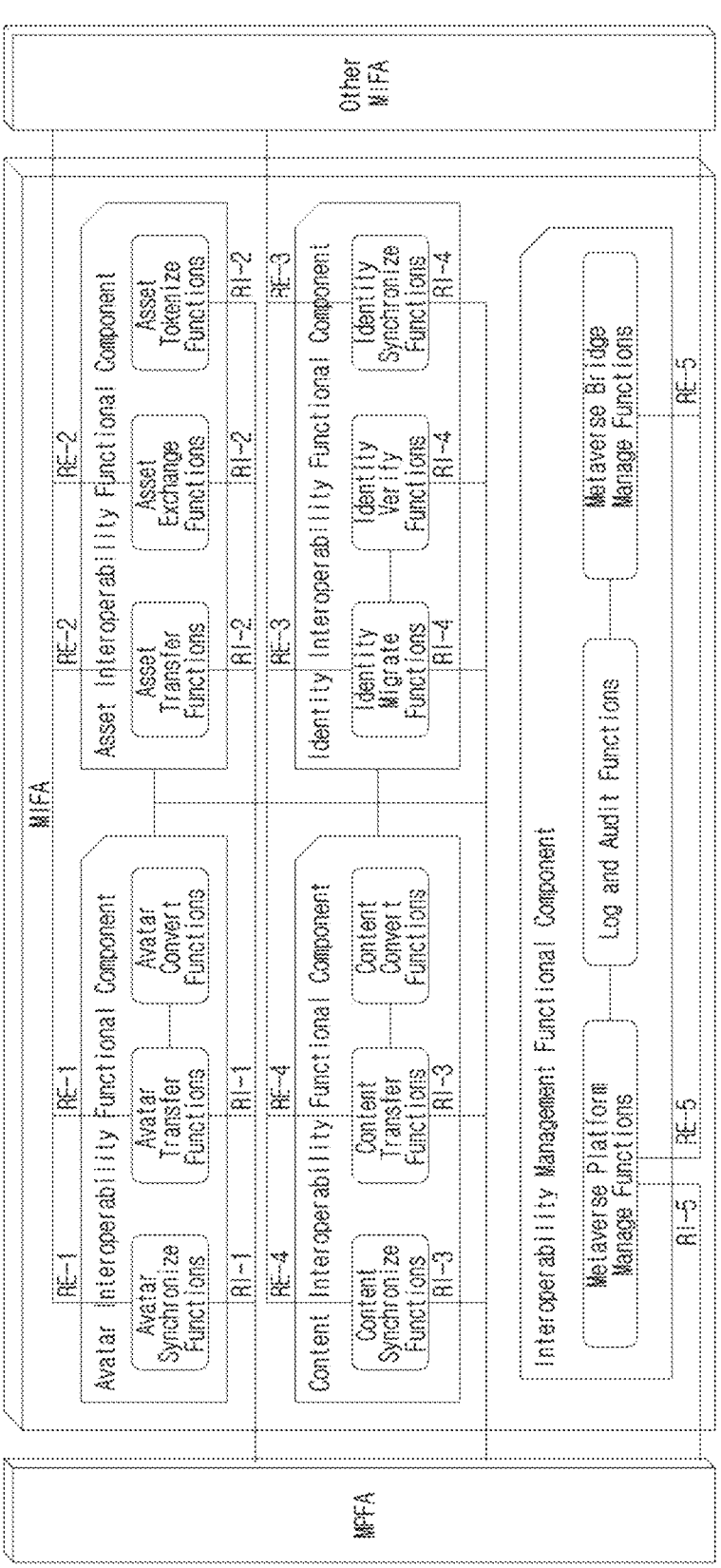
FIG. 4 illustrates the metaverse interoperability functional architecture according to one embodiment of the present disclosure.

As an example of the present disclosure, as shown in FIG. 4, The metaverse interoperability functional architecture may include an Avatar Interoperability Functional Component (AVIFC), Identity Interoperability Functional Component (IDIFC), Asset Interoperability Functional Component (ASIFC), and Content Interoperability Functional Component (COIFC).

Metaverse service providers may selectively select components based on their needs for interoperability of the Metaverse platform.

Hereinafter, each function that constitutes the metaverse interoperability function architecture may collectively refer to a module that performs the corresponding function.

Functions and Configuration of AVIFC

AVFIC may achieve avatar interoperability across various metaverse platforms and enable seamless movement and utilization of avatars while maintaining their appearance, identity, and functionality.

AVFIC may include features such as avatar transfer and synchronization to ensure compatibility and consistency of avatars across platforms. As an example, AVFIC may include avatar transfer functions (AVTF), avatar convert function (AVCF), and avatar synchronize function (AVSF).

Avtar Transfer Function

When the avatar transfer function is applied, the avatar of a specific metaverse platform can be moved to various metaverse platforms while maintaining its original characteristics. The avatar transfer function module may manage avatar data transfer between different metaverse platforms.

As an example, an avatar transfer function module may support the transmission of state data, avatar profiles, accessories, controls, rigs, skeletons, etc. across the metaverse platform.

When an avatar moves to another Metaverse platform through the Avatar Transfer function, each Metaverse platform may exchange constraints during the migration process for compliance and performance.

The avatar transfer function module may interact with the source and destination metaverse platforms to import and export avatar data through reference point RI-1, which will be described later. Additionally, the avatar transfer function module may interact with the avatar transfer function through reference point RE-1, which will be described later.

Avatar Convert Function

If the roaming avatar does not satisfy the constraints of the target metaverse platform exchanged through the interaction of each platform's avatar transfer function, the function may convert the data of the roaming avatar. The transformations described above may include transformations of appearance, accessories, and status data.

The avatar convert function module may interact with the destination metaverse platform to obtain policies such as avatar appearance guidance through reference point RI-1. The avatar convert function module may convert the avatar obtained from the avatar transfer function module to the destination metaverse platform and deliver (or hands over) it to the destination metaverse platform through the RI-1 reference point.

Avatar Synchronize Function

The avatar synchronize function can promote seamless movement and activities of avatars on various metaverse platforms. Users can import their created avatars to a variety of platforms, and their actions and activities within each environment can be recorded. The records can be synced back to the avatar's original platform, allowing users to manage all their activities in one place.

After an avatar roams between metaverse platforms, its properties can be synchronized to ensure consistency. The avatar synchronize function module may roam and experience an avatar across metaverse platforms and then synchronize the attributes of the avatar to ensure consistent representation of the avatar across metaverse platforms.

The avatar synchronize function module may interact with the roaming metaverse platform, which retrieves the latest information of the roaming avatar through reference point RI-1, and the home metaverse platform, which synchronizes information through reference point RE-1.

Asset Interoperability Functional Component (ASIFC)

ASIFC may facilitate the transfer between Metaverse platforms of digital assets, including tokenized items such as non-fungible tokens (NFTs), virtual real estate, and digital currency.

ASIFC allows users to seamlessly move and trade assets across a variety of platforms, thereby facilitating cross-platform commerce. ASFIC may be implemented through technologies such as blockchain, which ensures secure and transparent transfer of assets.

As an example, ASIFC may include an asset transfer function (ASTF), an asset exchange function (ASEF), and an asset tokenize function (ASTKF).

Asset Transfer Function

When the asset transfer function is applied, tokenized assets can be smoothly transferred between different Metaverse platforms. Asset transfer function can ensure that necessary information, including ownership records, provenance, and metadata, is accurately transferred to maintain asset integrity during the process.

The asset transfer function module may interact with source and destination metaverse platforms for importing and exporting asset data via reference point RI-2. The asset transfer function module can interact with the asset transfer function through reference point RE-2.

Asset Exchange Function

When the asset exchange function is applied, the user can exchange or convert the asset to another format or currency. The asset exchange function may support seamless conversion of digital currencies, valuation mechanisms, and liquidity options, allowing users to trade and utilize assets in various Metaverse ecosystems.

As an example of the present disclosure, if the asset is a blockchain-based cryptocurrency, the exchanged asset may reside in a cryptocurrency wallet of a specific blockchain supported by the destination Metaverse platform. If the asset is a digital currency that is only valid on a specific Metaverse platform, the exchanged asset may be stored in the user's digital wallet on the destination platform.

This uses RE-2 reference points to obtain policies such as exchange ratio, validation mechanism, and blockchain, and actual asset exchange can be performed. Additionally, a specific user's assets can be searched by interacting with the Metaverse platform through reference point RI-2.

Asset Tokenize Function

The asset tokenize function may include converting digital assets, such as virtual real estate or collectibles, into tokenized form using blockchain technology. The asset tokenize feature may assign unique identifiers and metadata to the aforementioned assets, enabling transfer and interoperability between Metaverse platforms.

If there is a need to create an NFT for use in another metaverse that supports a particular blockchain, the asset tokenize function module may tokenize the MPFA asset by interacting with the MPFA through reference point RI-2. The above functions do not interact directly with other MIFAs, but may utilize indirect interoperability approaches.

Content Interoperability Functional Component (COIFC)

COIFC allows various metaverse platforms to share and exchange various content in various media formats, such as 3D models, animation, sound, and text, between platforms.

Additionally, COIFC may help creators and developers easily create, share, and distribute content on various platforms. Additionally, COIFC may manage considerations for content storage, retrieval, archiving, and meeting legal and regulatory requirements.

As an example, COIFC may include a content transfer function (COTF), a content convert function (COCF), and a content synchronize function (COSF).

Content Transfer Function

The content transfer function is responsible for transferring content data between metaverse platforms and may safely improve efficiency. By exchanging content data including information for management, searchability, and interoperability to enable transmission between Metaverse platforms, seamless transmission of Metaverse content between Metaverse platforms can be facilitated.

This allows user content to be shared securely on the Metaverse platform through encryption, access control, and authentication mechanisms to protect data. Here, content management may be managed by the Metaverse platform rather than MIFA.

The content transfer function may interact with the MPFA through reference point RI-4 to retrieve content from the platform, and may interact with the corresponding CIFC's COTF through RE-4. The content transfer function may forward the received content to COCF for conversion or directly to MIFA via RI-4.

Content Convert Function

The content convert function may ensure compatibility across various metaverse platforms by converting metaverse content, including user-created content, into a format supported by the target platform.

As an example, content convert functions may assist in maintaining the quality and fidelity of content during conversion, optimize for efficient rendering and performance, and adapt to the specific requirements and limitations of the target platform. This can improve the portability of content data between platforms.

The content convert function may convert the content received from COTF and transfers it to COTF, and COTF may transfer the converted content to MPFA through reference point RI-4.

Content Synchronize Function

The content synchronize function may synchronize changes to specific content across various platforms to ensure that users always have the latest version.

Content synchronize may detect and resolve conflicts that may arise when multiple users make changes to content at the same time, maintaining the integrity and consistency of content across platforms and providing users with tools to manage and resolve conflicts.

Additionally, the content synchronize function may track and manage different versions of content, allowing users to revert to previous versions and provide change history.

The content synchronize function may interact with the COSF of the corresponding MIFA to synchronize specific content through reference point RE-3, and may also interact with the MPFA to synchronize content across multiple metaverses through reference point RI-3.

IDIFC

IDIFC may ensure a unified identity experience across virtual worlds by enabling the transfer of user IDs and related data between different metaverse platforms.

Through the operations and functions supported by IDIFC, users do not need to create a new account each time they switch to another Metaverse platform. IDIFC may manage/exchange/utilize not only user IDs but also the IDs of various entities in the metaverse that require recognition and identification.

As an example, IDIFC may include an identity migrate function (IDMF), an identity verify function (IDVF), and an identity synchronize function (IDSF).

Identity Migration Function (IDMF)

The identity migration function can safely and efficiently transfer IDs and related information related to users, avatars, virtual assets, permissions, preferences, etc. between metaverse platforms.

The identity migration function may support smooth transition and identity integrity across the Metaverse platform while providing users with control over the scope and granularity of data migration related to their identity.

The identity migration function may interact with the MPFA and IDMF of the corresponding MIFA through reference points RI-3 and RE-3, respectively. If the MPFA manages the ID itself, the identity migration function may hand over migrated ID information directly to the MPFA. If the ID is platform independent, the identity migration function may hand over the information to the IDVF for verification.

Identity Verify Function

The identity verification function may ensure the authenticity and legitimacy of the transmitted ID. As an example, Identity verification function may prevent unauthorized access and impersonation across platforms by utilizing various protocols and technologies such as cryptographic signatures, decentralized identifiers (DID), zero-knowledge proofs.

The identity verification function may be integrated with existing Metaverse platform-specific authentication mechanisms for a seamless user experience.

The identity verification function may interact with the MPFA through RI-3 to verify the validity of migrated identities. In some cases, an ID may be valid but not permitted on a specific Metaverse platform for policy or administrative reasons. Therefore, the identity verification function can interact with MPFA for the verification process.

Identity Synchronize Function

If the identification synchronize function is used, the migrated IDs can be updated in real time or periodically throughout the metaverse platform. In other words, the identification synchronize function maintains user profiles, avatars, assets, and permissions consistently across various metaverse platforms, so that conflicts that may arise due to simultaneous updates of various metaverse platforms can be resolved. In other words, the identification synchronize function may provide users with a way to manage synchronized data across platforms.

The identification synchronize function may interact with the IDSF of the corresponding MIFA through RE-4 and may also interact with the MPFA through RI-4 for synchronization of specific IDs. If the original ID is in the home metaverse platform, the identification synchronize function may synchronize changes made during roaming in the home metaverse. However, it is also possible to store information in third-party service providers such as cloud storage and blockchain. However, the identification synchronize function may perform synchronization regardless of the management method.

IMFC

IMPC may manage and facilitate seamless interaction between various metaverse platforms and metaverse bridges. Management of seamless interactions between the Metaverse Platform and the Metaverse Bridge may include overseeing contracts and policies governing the relationship between the Metaverse Platforms.

As an example of the present disclosure, IMFC may include a metaverse platform management function (MPMF), a metaverse bridge management function (MBMF), and a logging and auditing function (LAF).

Metaverse Platform Management Function (MPMF)

MPMF may be responsible for managing the agreements between metaverse platforms. MPMF may keep track of the specifics of these agreements, ensuring that all parties adhere to the established terms. MPMF may include exchanging and managing of manifesto that contains the details of bilateral agreements, which are direct agreements between two platforms regarding their interaction and data exchange protocols. MPMF may also oversee the policies, codes of conduct, and any regulatory guidelines that each platform must follow to maintain compatibility and ethical standards across the metaverse.

Each metaverse platform may manage its manifesto and uses it for negotiating with other metaverse platforms.

Through these negotiations, it is possible to figure out any functionalities that are not interoperable or not. If MPMF needs functionalities that are not compatible directly, it may ask Metaverse Bridge Management Functions to solve the situation. This involves ensuring that all platforms comply with agreed-upon norms and practices, promoting a safe and respectful environment for users.

MPMF may interact with MP to get its manifesto information through the reference point RI-5 and provides information or a guide for the decision-making process for each Functions in MIFM. MPMF may interact with the MPMF of the corresponding MIFM to make an interoperable channel between them through the reference point RE-5. MPMF may also interacts with MBFA of a metaverse bridge to make a detour channel between metaverse platforms through RE-5.

Metaverse Bridge Management Function

The metaverse bridge management function may manage information of the metaverse bridge that acts as a converter.

Specifically, the metaverse bridge management function may enable seamless interaction between platforms by adjusting information and content to be compatible across various metaverse platforms.

The Metaverse Bridge may register information in bilateral agreements or negotiations through the Metaverse Bridge management function. The Metaverse Bridge may support interoperability between Metaverses of different (heterogeneous) platforms.

The metaverse bridge management function may manage the virtual bridge of the MIFA where it resides. In other words, the metaverse bridge management function of the metaverse bridge manages all virtual bridges for multiple MIFAs, and the metaverse bridge management function of the MIFA may only manage virtual bridges.

MPMF may interact with the corresponding metaverse bridge management function to manage virtual bridges connecting heterogeneous metaverse platforms through RE-5 reference points.

Log and Audit Function (LAF)

Log and Audit function may perform logging and auditing, which are important for maintaining transparency and accountability.

Here, logging refers to the operation of systematically recording events, transactions, and interactions that occur between metaverse platforms. Additionally, audits may include reviewing and examining these logs to ensure compliance with interoperability agreements and identify any problems or inconsistencies that may arise.

However, the logging and audit function module may not directly store all information related to the logging and audit function. Instead, the Metaverse platform may provide an easily retrievable interface for all relevant information with Log and Audit function.

Access to the above interface may provide up-to-date logging and auditing data without the need to maintain a separate comprehensive database for all information related to log and audit functions.

By offering an interface for the above-described purposes, IMFC may streamline the process of monitoring compliance with interoperability agreements and policies, as well as review and analysis of interactions between various platforms. The method may allow real-time access to relevant data directly from the source (Metaverse platform) by supporting a dynamic and efficient supervision mechanism.

Log and audit functions may interact with any function to record operational information for further auditing or inspection. However, log and audit functions may not interact directly with the MPFA or the corresponding MIFA. Log and audit functions include logs and all records can be accessed via MPMF or MBMF.

Reference Point for Cross-Platform Metaverse

The following describes the reference points of the interoperability architecture for the cross-platform metaverse. The reference point can be divided into MPFA-MIFA and MIFA-MIFA.

MPFA-MIFA reference points may include Reference points RI-1 (MPFA-AVIFC), RI-2 (MPFA-ASIFC), RI-3 (MPFA-IDIFC), RI-4 (MPFA-COIFC), and RI-5 (MPFA-IMFC).

Specifically, RI-1 may be used for interaction between AVIFC of MPFA and MIFA for functions of importing and exporting avatar data.

RI-2 may be used for interaction between MPFA and ASIFC of MIFA for asset data import and export functions, asset tokenization, and asset exchange.

RI-3 may be used for interaction between MPFA and COIFC of MIFA for importing and exporting of content and its metadata, getting policies regarding intellectual property and distribution, getting policies about the validity of migrations, such as validation procedures, report of usage statistics.

RI-4 may be used for interaction between MIFA and IDIFC of MIFA for importing and exporting of identity data.

RI-5 may be used for interaction between MPFA and IMFC of MIFA.

Reference points for other MIFAs (MIFA-MIFA) may include RE-1 (AVIFC-AVIFC), RE-2 (ASIFC-ASIFC), RE-3 (IDIFC-IDIFC) and RE-4 (COIFC-COIFC).

As an example, RE-1 refers to a reference point between AVIFMs that allows avatars to interoperate.

RE-2 refers to the reference point between ASIFCs to support asset interoperability.

RE-3 refers to the reference point between COIFC to support content interoperability.

RE-4 refers to the reference point between IDIFMs to support ID interoperability.

RE-5 refers to the reference point between IMFCs to support interoperability management.

High-Level Information Flow

The following describes how the functions of functional components interact with each other to support migration of avatars, assets, content, and IDs and registration in the corresponding metaverse.

Avatar Migration Flow

The high-level information flow through which each of the functions described above interact within the avatar migration procedure is described. It is assumed that both Metaverse platforms have established channels through the Metaverse platform registration process, which will be described later.

Figure 5A:
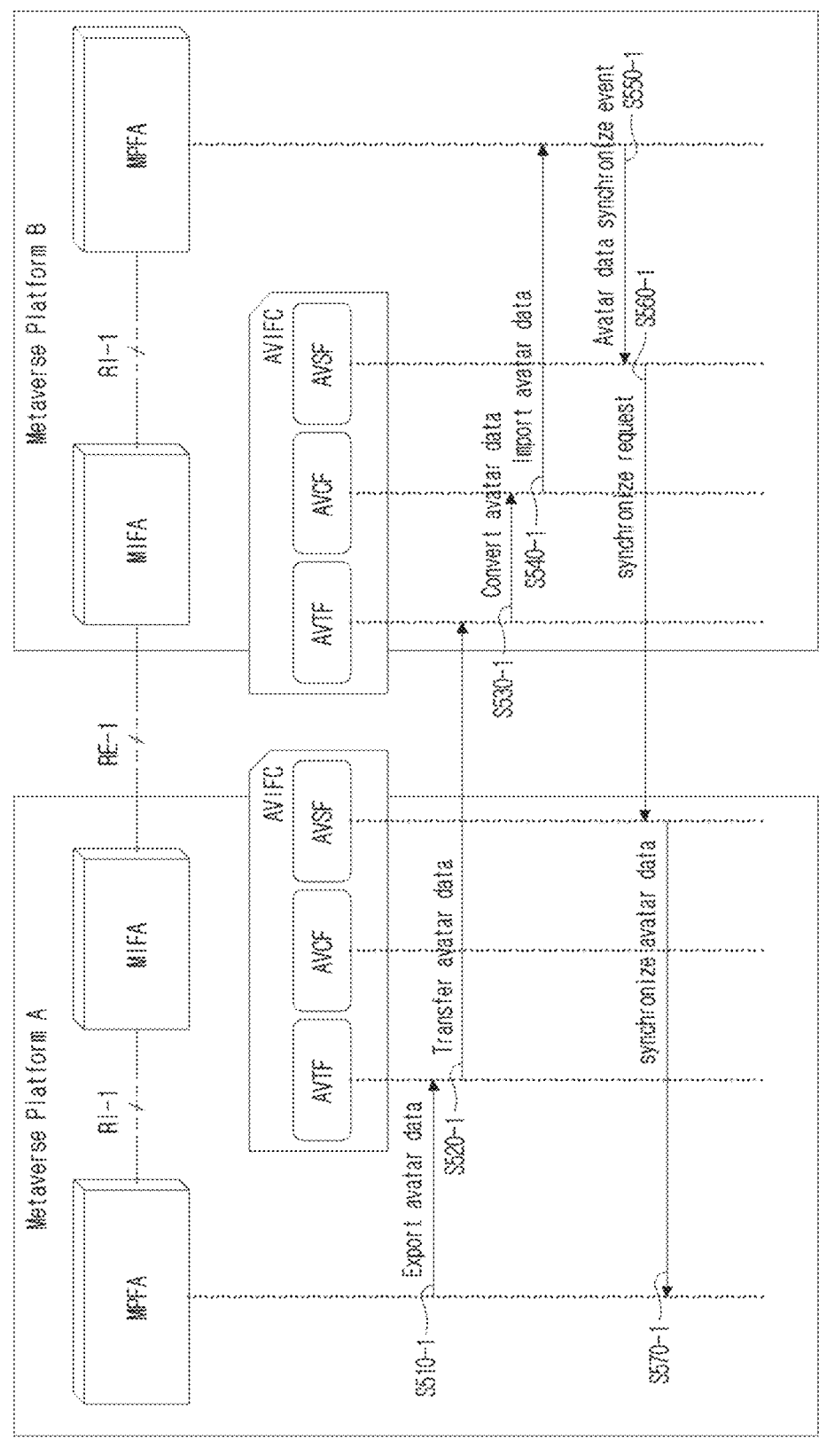
FIG. 5A shows the flow of information about avatar movement between metaverse platforms according to an embodiment of the present disclosure.

As an example of the present disclosure, FIG. 5A shows the flow of information about avatar movement between metaverse platforms, which will be described later.

In step S510-1, when the avatar moves to metaverse platform B, the MPFA of metaverse platform A may export the avatar data through the AVTF of MIFA (e.g., to metaverse platform B).

In step S520-1, the AVTF of metaverse platform A may interact with the AVTF of the corresponding MIFA of metaverse platform B.

In step S530-1, AVCF may convert avatar data received from AVTF of metaverse platform A if conversion is necessary to meet the MPFA policy of metaverse platform B.

In step S540-1, the MPFA of metaverse platform B may retrieve avatar data from AVCF.

In step S550-1, if avatar data needs to be synchronized during activities on visiting metaverse platform B, the MPFA of visiting metaverse platform B may request the AVSF of MIFA to the original metaverse platform A.

In step S560-1, AVSF may interact with MIFA's ASF on home metaverse platform A.

In step S570-1, the AVSF of MIFA on metaverse platform B may transmit a synchronization request to the MPFA on home metaverse platform A.

Asset Migration Flow

The following describes high-level information flow to describe how each function interacts in asset migration. Both Metaverse platforms have established channels through the Metaverse platform registration process, which will be described later, and each MIFA is assumed to be aware of the policies or digital currency of the relevant MPFA.

Figure 5B:
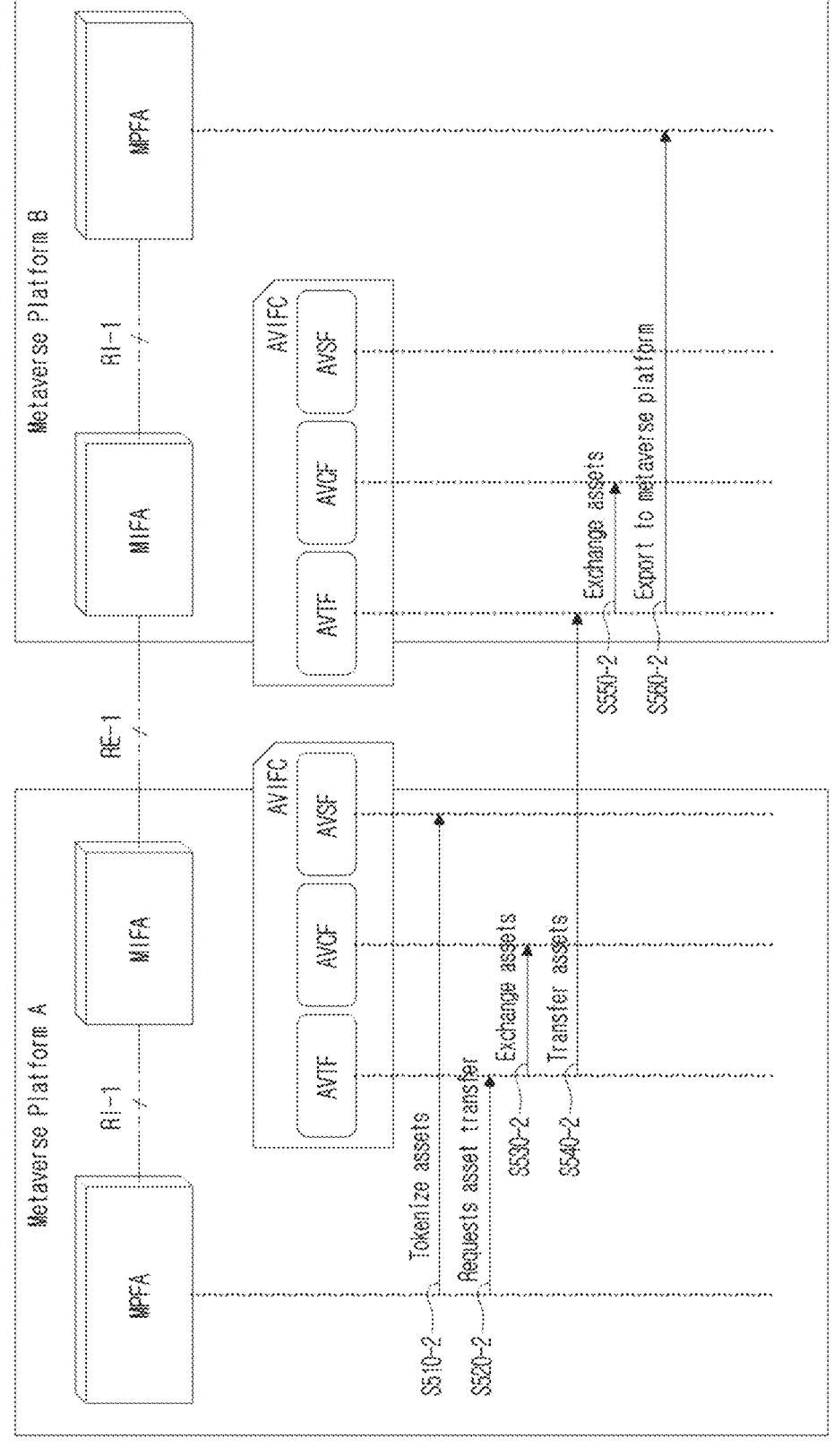
FIG. 5B shows the information flow for asset movement between metaverse platforms according to an embodiment of the present disclosure.

As an example of the present disclosure, FIG. 5B shows information flow regarding asset movement between metaverse platforms, which will be described later.

In step S510-2, if the MPFA of Metaverse Platform A wishes to assetize specific content or assets so that they can be accessed and used across multiple Metaverse platforms, it may request ASTKF to tokenize the assets.

In step S520-2, when a user of Metaverse Platform A wishes to transmit his or her assets (e.g., NFT, digital currency, etc.) to another user of Metaverse Platform B, it may request ASTF to transmit asset-related information.

In step S530-2, for platform-dependent digital currency transfers, the ASTF of Metaverse Platform A may interact with ASEF to exchange the currency for global currency or the currency of Metaverse Platform B.

In step S540-2, the ASTF of Metaverse Platform A may interact with the ASTF of Platform B to notify the transfer of digital assets. ASTF may use blockchain to transfer assets.

In step S550-2, if digital currency is received, ASTF of Metaverse Platform B may request ASEF to exchange it for digital currency of Metaverse Platform B if Metaverse Platform B uses its own platform-dependent currency.

At step S560-2, the ASTF of Metaverse Platform B may hand over digital assets to the MPFA of Platform B.

Content Migration Flow

The high-level information flow through which each of the functions described above interact within the content migration procedure is described. It is assumed that both Metaverse platforms have established channels through the Metaverse platform registration process, which will be described later.

Figure 5C:
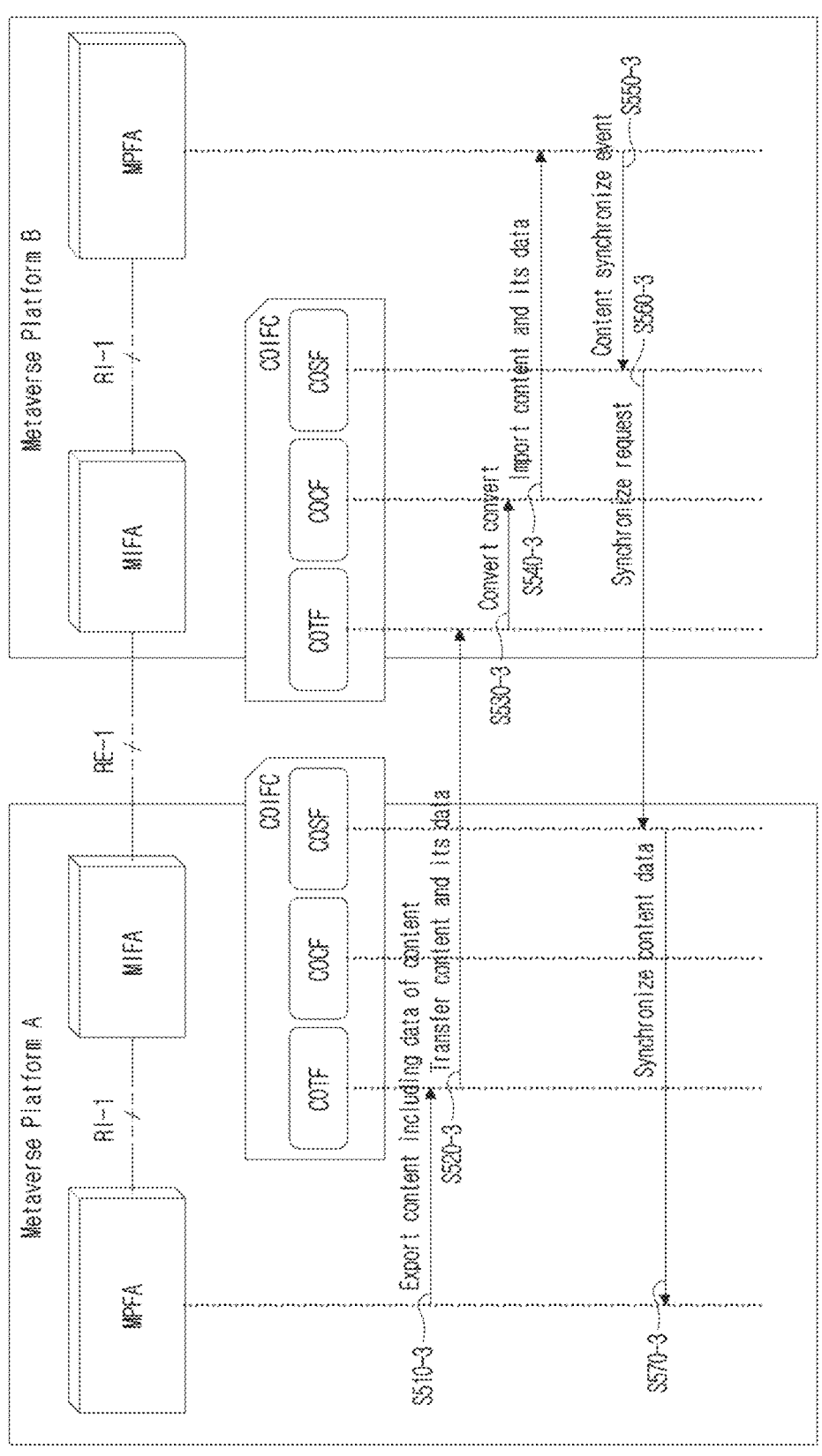
FIG. 5C shows the flow of information about content movement between metaverse platforms according to an embodiment of the present disclosure.

As an example of the present disclosure, FIG. 5C shows the flow of information on content movement between metaverse platforms, which will be described later.

In step S510-3, when specific content needs to be moved to another metaverse platform B, the MPFA of metaverse platform A may export the content and related metadata to the COTF of MIFA.

In step S520-3, the COTF of metaverse platform A may interact with the COTF of the corresponding MIFA of platform B.

In step S530-3, the COCF of metaverse platform A may convert the content and data received from the COTF of platform A if conversion is necessary to meet the MPFA policy of platform B.

In step S540-3, MPFA of Metaverse Platform B may retrieve content and data from COCF.

In step S550-3, if synchronization of content and corresponding data in use on metaverse platform B is required, the MPFA of metaverse platform B may request the COSF of the MIFA on metaverse platform A.

In step S560-3, COSF on metaverse platform B may interact with ASF on MIFA on home metaverse platform A.

In step S570-3, the COSF of MIFA on metaverse platform B may send a synchronization request to the MPFA on metaverse platform A.

Meanwhile, the identity migration flow may proceed similarly to the avatar, asset, and content migration procedures described above.

High-Level Information Flow for Registration of Communication Channels Between Metaverse Platforms The following describes a high-level information flow to illustrate how each relevant function interacts with the metaverse platform to establish an interoperable communication channel.

Figure 6:
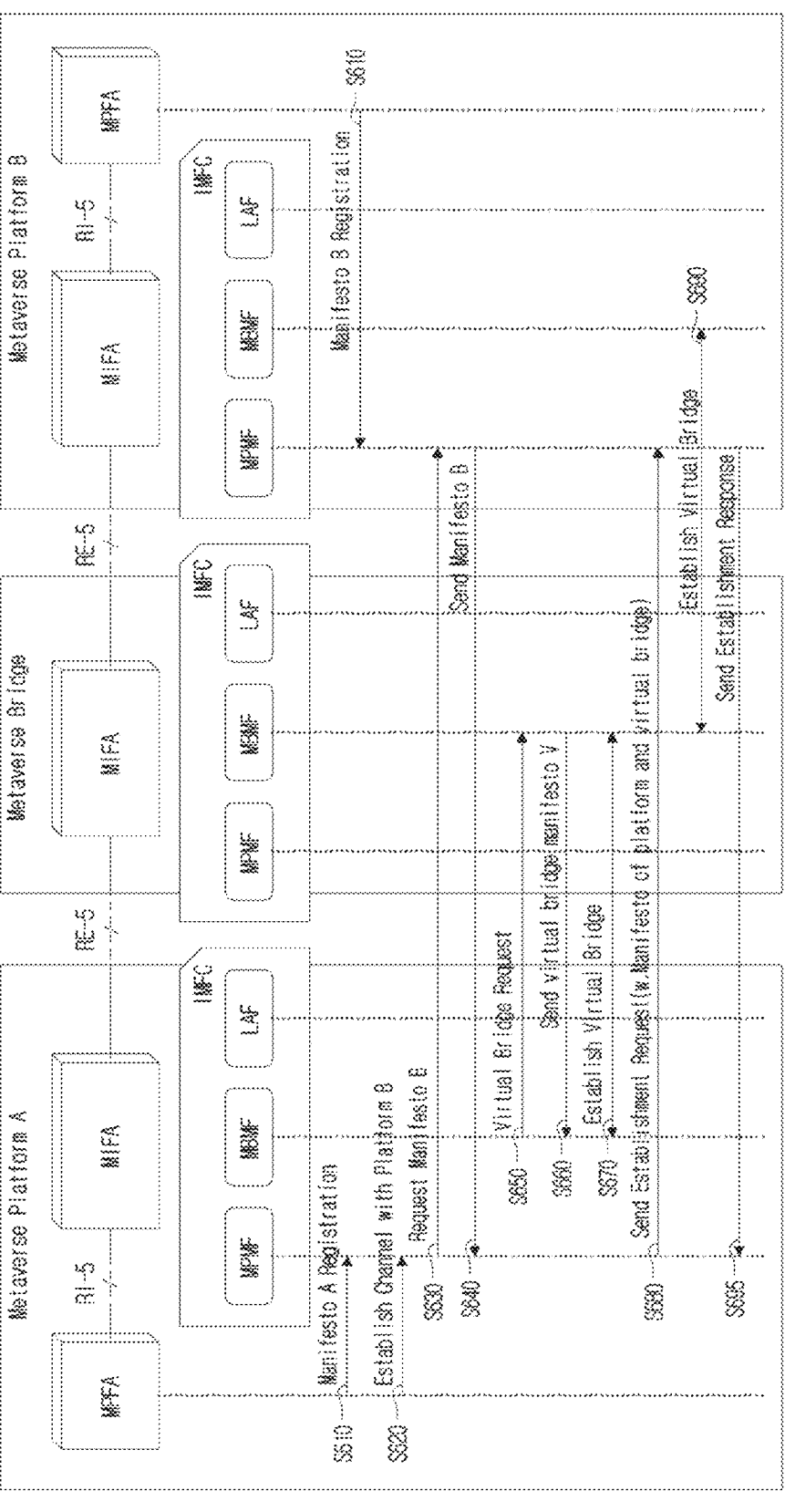
FIG. 6 illustrates a procedure for registering a corresponding metaverse platform for registration/establishment of an interoperable communication channel according to an embodiment of the present disclosure.

As an example of the present disclosure, as shown in FIG. 6, information registering the corresponding metaverse platform may be transmitted and received to establish an interoperable communication channel. In FIG. 6, MVP may mean metaverse platform, MVB may mean metaverse bridge, and Mgmt may mean management.

In step S610, each of the two MPFAs (i.e., each MPFA of Metaverse Platform A (or, first Metaverse Platform) and Metaverse Platform B (or, second Metaverse Platform)) registers its manifesto data with the MIFA (i.e., each MIFA of Metaverse Platform A and Metaverse Platform B), and each MIFA may maintain its manifesto data for further interaction with each other's Metaverse platform.

In step S620, when MPFA starts the procedure to form a channel with another metaverse platform B, a request for manifest information of metaverse platform B may be sent to the MPMF of MIFA's IMFC.

In step S630, MPMF may request B's manifesto from the MPMF of the corresponding metaverse platform B.

In step S640, the MPMF of the corresponding MIFA may transmit Manifesto B.

At step S650, MIFA of the original metaverse platform A may confirm interoperability by comparing the manifesto data of the two platforms. If MIFA of the original metaverse platform A determines that metaverse bridge support is necessary, it may request virtual bridge setup from the metaverse bridge by sending the manifestos of both platforms.

In step S660, the MBMF of the metaverse bridge may transmit Manifesto V for the virtual bridge.

In step S670, the MBMF of originating MIFA A may establish a communication channel with the metaverse bridge.

In step S680, MPMF may transmit proposal manifestos A and V including information of the original platform and virtual bridge.

In step S690, the MPMF of the metaverse platform B may establish a communication channel with the metaverse bridge.

In step S695, the MPMF of the metaverse platform B may respond with an answer manifesto containing the final negotiated manifesto information.

Figure 7:
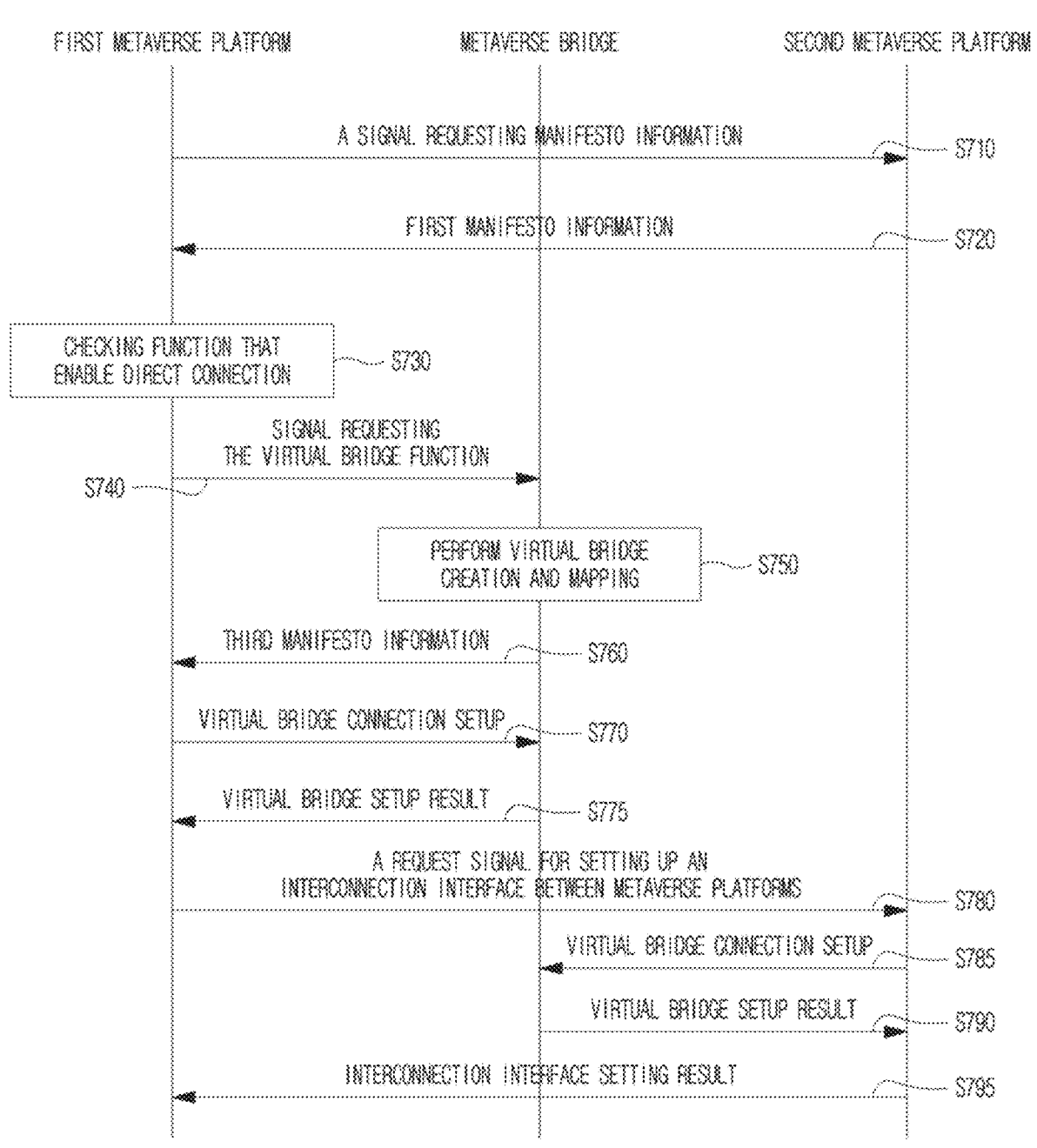
FIG. 7 relates to a method of controlling an interoperability architecture for a cross-platform metaverse, according to an embodiment of the present disclosure.

FIG. 7 relates to a method of controlling interoperability architecture for a cross-platform metaverse, according to an embodiment of the present disclosure.

The first metaverse platform may transmit a signal requesting manifesto information to the second metaverse platform (S710).

That is, the first metaverse platform may transmit a signal requesting manifesto information to the second metaverse platform in order to secure (or set/configure) an interworking channel with the second metaverse platform. As an example, the MVP management function of the first metaverse platform may transmit a signal requesting manifesto information to the MVP management function of the second metaverse platform.

Before S710, the first metaverse platform and/or the second metaverse (i.e., MP of the first metaverse platform and/or MP of the second metaverse platform) register its manifesto data into its IMFC in MIFM, and keep the registered manifesto data for further interactions with other metaverse platforms.

In response to this, the second metaverse bridge may transmit the first manifesto information of the second metaverse platform to the first metaverse platform (S720).

As an example, the first manifesto information may include at least one of information related to the second metaverse platform and information about functions (or the features) supported by the second metaverse platform.

And, the second manifesto information may include at least one of information related to the first metaverse platform and information on functions supported by the first metaverse platform.

Information on the functions supported by each of the first metaverse platform and the second metaverse platform may include protocols and/or authentication information related to the functions supported by each of the first metaverse platform and the second metaverse platform.

In addition, the functions supported by each of the first metaverse platform and the second metaverse platform may include at least one of an avatar-related function, an asset-related function, a content-related function, or an identity-related function.

The first metaverse platform may confirm/check/decide/identify functions that enable direct connection based on the first manifesto information and the second manifesto information (S730). That is, the first metaverse platform may check/identify interoperability between the first metaverse platform and the second metaverse platform based on the second manifesto information and the first manifesto information of the first metaverse platform.

Specifically, the first metaverse platform may identify/check at least one function that enables direct connection (or compatibility) between the first metaverse platform and the second metaverse platform and at least one function that is not directly connectable (i.e., not directly compatible) based on the second manifesto information and first manifesto information of the first metaverse platform.

In describing the present disclosure, at least one function that cannot be directly connected (i.e., at least one function not capable of direction connection) may mean a function that requires support of a metaverse bridge. At least one function capable of direct connection may mean a function directly connected (or compatible) between the first metaverse platform and the second metaverse platform. For example, the first metaverse platform may identify at least one function that can be directly connected (i.e., at least one function capable of direction connection) by comparing its manifesto information (i.e., second manifesto information) with the first manifesto information of the second metaverse platform.

As another example, the first metaverse platform may check interoperability between the first metaverse platform and the second metaverse platform by comparing the first manifesto information and the second manifesto information. Accordingly, the first metaverse platform may determine/decide whether support of the metaverse bridge is necessary to establish an interoperable communication channel between the second metaverse platforms.

That is, the operation of identifying at least one function that cannot be directly connected to the first metaverse platform may mean checking whether establishment of an interoperable communication channel between the first metaverse platform and the second metaverse platform may be performed with the support of the metaverse bridge.

If there is at least one function in the first metaverse platform that cannot be directly connected between the first metaverse platform and the second metaverse platform, it may be identified that support of a metaverse bridge is required for interoperability of the first metaverse platform and the second metaverse platform.

Additionally or alternatively, the first metaverse platform may identify at least one function capable of direct connection between the first metaverse platform and the second metaverse platform. An operation of identifying at least one function capable of direct connection between the first metaverse platform and the second metaverse platform may be performed simultaneously with the operation of checking the interoperability of the first metaverse platform and the second metaverse platform, or may be performed separately.

Here, comparison of the first manifesto information and the second manifesto information may be performed by MIFA of the first metaverse platform.

The first metaverse platform may transmit a signal requesting the virtual bridge function to the metaverse bridge (S740).

As an example, the first metaverse platform may transmit information related to at least one function that cannot be directly connected among the first manifesto information and the second manifesto information to the metaverse bridge through a signal requesting a virtual bridge function.

That is, the first metaverse platform may transmit the first manifesto information and the second manifesto information, excluding information related to functions that may be directly connected, to the metaverse bridge.

Additionally or alternatively, if support of the Metaverse Bridge is determined/identified to be necessary for interoperability between the first and second Metaverse platforms, the first metaverse platform may transmit manifesto information for setting up a virtual bridge (or a communication channel between the first metaverse platform and the second metaverse platform) to the metaverse bridge.

Here, the manifesto information for setting up the virtual bridge may include i) information related to functions that can be directly connected among the first manifesto information and the second manifesto information or/and ii) all first manifesto information and second manifesto information.

Here, the MVB management function of the first metaverse platform may transmit manifesto information for setting a virtual bridge to the MVB management function of the second metaverse platform.

As an example of the present disclosure, information related to at least one function capable of direct connection among the first manifesto information and the second manifesto information may be transmitted from the first metaverse platform to the second metaverse platform. Additionally, a direct connection interface may be set based on information related to at least one function capable of direct connection by the second metaverse platform.

Accordingly, the first metaverse platform and the second metaverse platform may exchange information related to at least one function that can be directly connected through a direct connection interface.

The metaverse bridge may perform virtual bridge creation and mapping operations (S750).

That is, the metaverse bridge may perform an operation of creating a virtual bridge for interconnection of the first metaverse platform and the second metaverse platform. For example, the metaverse bridge may first set up a virtual bridge (i.e., the first virtual bridge) between the first metaverse platform and the metaverse bridge.

In describing the present disclosure, the first virtual bridge may collectively refer to a virtual bridge connected between the metaverse bridge and the first metaverse platform. And, the second virtual bridge, which will be described later, may collectively refer to a virtual bridge connected between the metaverse bridge and the second metaverse platform.

Additionally or alternatively, the metaverse bridge may create/generate at least one converting engine for interworking between the first metaverse platform and the second metaverse platform. The Metaverse Bridge may transmit information on a specific conversion engine among at least one conversion engine to the first Metaverse platform.

Specifically, the metaverse bridge may allocate virtual bridge-related resources for interworking/connection of the first metaverse platform and the second metaverse platform. Here, the metaverse bridge may create/generate a converting engine (or plug-in) pipeline for compatibility between the first metaverse platform and the second metaverse platform.

And, the Metaverse Bridge may select the optimal conversion engine(s) for the two Metaverse platforms. For example, it may be assumed that there are protocols 1, 2, 3, 4, 5, and 6 for avatar linkage, the first metaverse platform supports 1, 2, and 3, and the second metaverse platform supports 4, 5. Here, the Metaverse Bridge may select 3 to 5 conversion engines, which are the conversion combinations with the best performance.

The metaverse bridge may transmit third manifesto information related to a virtual bridge to the first manifesto platform (S760). For example, the third manifesto information includes information on resources allocated to the first metaverse platform (e.g., information on a specific conversion engine selected by the metaverse bridge, etc.) to the first metaverse platform.

Accordingly, the first metaverse platform may transmit a first request signal requesting connection setup of the virtual bridge to the metaverse bridge based on the third manifesto information (S770).

The metaverse bridge may transmit information related to virtual bridge setup (i.e., information related to virtual bridge connection setup) to the first metaverse platform according to the first request signal (S775).

That is, the Metaverse bridge may establish virtual bridge settings by performing a suitability process for the first request signal and transmit information on the established virtual bridge settings to the first Metaverse platform. However, the interconnection pipe between the second metaverse platforms may not be opened/established yet.

For example, the first metaverse may establish the virtual bridge connection with the metaverse bridge.

Here, the third manifesto information may include information about the address, connection method, and/or protocol required for the second metaverse platform to connect to the virtual bridge (e.g., second virtual bridge). Additionally, information about the address, connection method, and protocol required to access the virtual bridge (e.g., the second virtual bridge) may be encrypted based on the public key of the second metaverse platform.

Additionally or alternatively, the third manifesto information may include manifesto information related to the virtual bridge. As another example, information related to virtual bridge setup may include first manifesto information and/or manifesto information for functions that cannot be directly connected.

The first metaverse platform may transmit a request signal for establishing an interconnection interface between metaverse platforms to the second metaverse platform (S780).

That is, the first metaverse platform may set up or establish a virtual bridge connection and transmit information related to the virtual bridge setup (e.g., the first manifesto information and the third manifesto information) to the second metaverse platform. The second metaverse platform may establish a virtual bridge connection based on at least one of the first manifesto information and the third manifesto information (e.g., information on the virtual bridge setup, etc.). (S785).

In other words, the second metaverse platform may establish a communication channel (i.e., virtual bridge connection) with the metaverse bridge.

Specifically, the second metaverse platform may decrypt information about the address, connection method, and protocol required to access the virtual bridge encrypted with the public key. The second metaverse platform may set up a virtual bridge connection based on information about the address, connection method, and protocol required to access the decrypted virtual bridge. Accordingly, a virtual bridge between the second metaverse platform and the metaverse bridge may be set up.

As an example of the present disclosure, a first virtual bridge may be set/configured/established between the first metaverse platform and the metaverse bridge, a second virtual bridge may be set/configured/established between the second metaverse platform and the metaverse bridge, and the first virtual bridge and the second virtual bridge may be set/configured/established. An interoperable communication channel between the first metaverse platform and the second metaverse platform may be set/configured/established through the connection between the bridges.

As another example of the present disclosure, a bridge between the first metaverse platform and the second metaverse platform may be established/set up through a metaverse bridge.

The second metaverse platform may receive the virtual bridge connection setup/establishment result from the metaverse bridge (S790).

In other words, the metaverse bridge may transmit the virtual bridge setup/establishment result to the second metaverse platform, so that the functional interconnection pipes between the two metaverse platforms via the metaverse bridge may be linked.

The second metaverse platform may transmit the results of interworking/interconnection interface settings (i.e., virtual bridge establishments) to the first metaverse platform (S795).

That is, the second metaverse platform may transmit a response indicating that a virtual bridge has been established and/or a response indicating that a communication channel between the first metaverse platform and the second metaverse platform has been established via the virtual bridge to the first metaverse platform.

In other words, the second metaverse platform may responds with the answer manifesto, which contains the information of the final negotiated manifesto.

According to the method described above, each Metaverse platform may ensure interconnection by exchanging manifesto files such as protocols, messages, and requirements related to various interconnection elements.

In other words, compatibility between Metaverse platforms may be improved, and users and developers may communicate and interact smoothly in different environments. Additionally, developers can more easily check user requirements and build a metaverse platform that reflects them.

Figure 8:
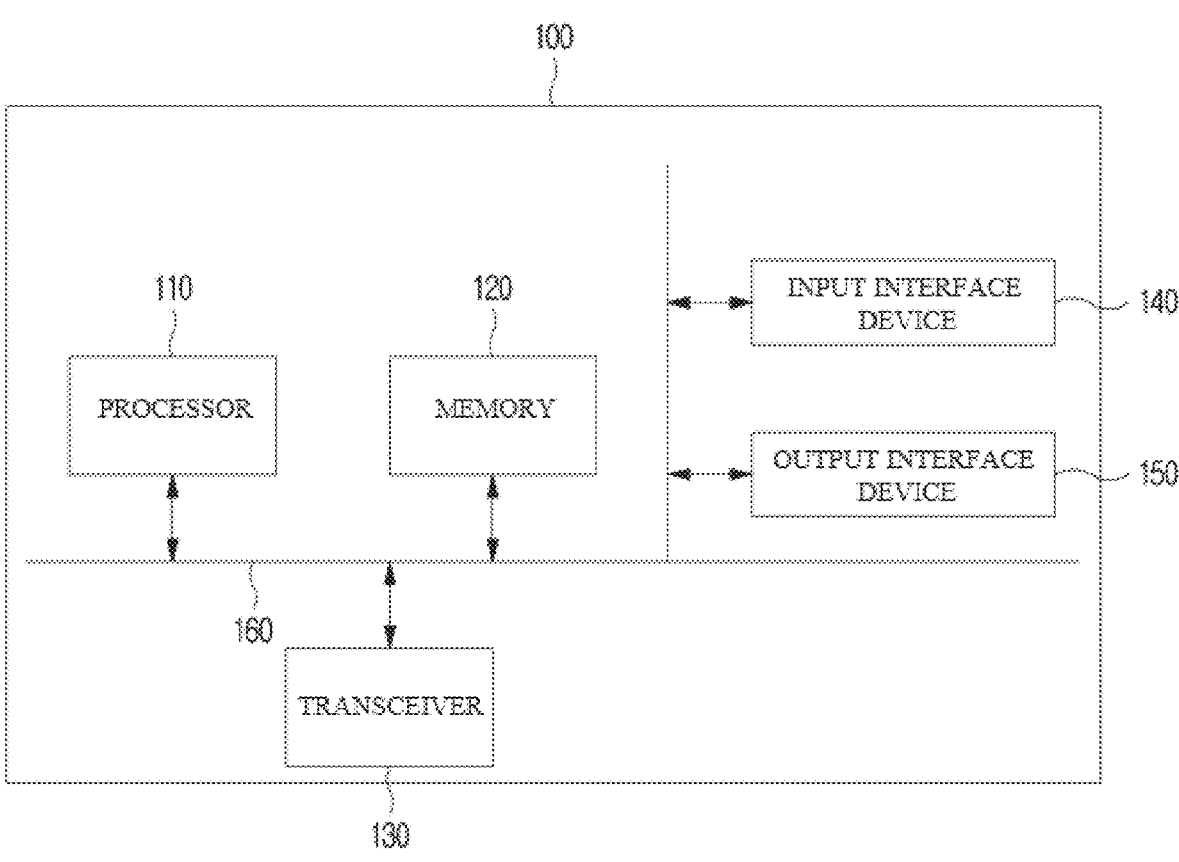
FIG. 8 is a block diagram illustrating a device according to an embodiment of the present disclosure.

FIG. 8 is a block diagram illustrating a device according to an embodiment of the present disclosure.

Specifically, one or more devices/servers constituting the metaverse platform and/or the metaverse bridge may be configured like the device 100 shown in FIG. 8. That is, the operations of the metaverse platform and/or the metaverse bridge described with reference to FIGS. 1 to 7 may be performed by the device 100 described with reference to FIG. 8.

The device 100 may include at least one of a processor 110, a memory 120, a transceiver 130, an input interface device 140, and an output interface device 150. Each component is connected by a common bus 160 and can communicate with each other. Additionally, each component may be connected through an individual interface or individual bus centered on the processor 110, rather than through the common bus 160.

The processor 110 may be implemented in various types such as an application processor (AP), central processing unit (CPU), graphics processing unit (GPU), etc., and may be any semiconductor device that executes instructions stored in the memory 120. The processor 110 may execute program commands stored in the memory 120. The processor 110 may be set to perform the method described above based on FIGS. 1 to 7.

As an example, the processor 110 mounted on the first metaverse platform may be set to identify at least one function that allows direct connection between the first metaverse platform and the second metaverse platform and at least one function that does not allow direct connection based on second manifesto information of the first metaverse platform and first manifesto information of the second metaverse platform.

As another example, the processor 110 mounted on the second metaverse platform may be set to set up/establish/configure a virtual bridge connection based on information about the virtual bridge (e.g., information related to the virtual bridge setup).

As another example, the processor 110 mounted on the second metaverse platform may decrypt information about the address, connection method, and protocol required to access the virtual bridge.

As another example, the processor 110 mounted on the second metaverse platform may set up/configure/establish a virtual bridge connection through information about the address, connection method, and protocol required to access the decrypted virtual bridge.

As another example, the processor 110 mounted on the metaverse bridge may be set/configured to create a virtual bridge for linking the first metaverse platform and the second metaverse platform.

As another example, the processor 110 mounted on the metaverse bridge may generate at least one converting engine for interworking between the first metaverse platform and the second metaverse platform.

The processor 110 may include one or more modules for performing the functions of the metaverse platform and/or metaverse bridge described above.

As an example, each function described with reference to FIGS. 1 to 7 may be performed by a module included in the processor 110. Additionally, each functional module described with reference to FIGS. 1 to 7 may be controlled by the processor 110.

Additionally or alternatively, the processor 110 may store program instructions for implementing at least one function for one or more modules in the memory 120 and control the operations described based on FIGS. 1 to 7 to be performed. That is, each operation and/or function according to FIGS. 1 to 7 may be executed by one or more processors 110.

Memory 120 may include various types of volatile or non-volatile storage media. For example, the memory 120 may include read-only memory (ROM) and random access memory (RAM). In an embodiment of the present disclosure, the memory 120 may be located inside or outside the processor 110, and the memory 120 may be connected to the processor 110 through various known means.

The transceiver 130 may perform a function of transmitting and receiving data processed/to be processed by the processor 110 with an external device and/or an external system. That is, each operation of the transceiver 130 may be controlled by the processor 110. That is, the processor 110 can transmit and receive various data through the transmitting and receiving unit 130.

As an example, the transmitting and receiving unit 130 of the transmitting device may transmit and receive the data described with reference to FIGS. 1 to 7.

As an example, the transceiver unit 130 mounted on the first metaverse platform may receive the first manifesto information of the second metaverse platform from the second metaverse platform.

As another example, the transceiver 130 mounted on the first metaverse platform may transmit information related to at least one function that cannot be directly connected among the first manifesto second manifesto information and the information to the metaverse bridge.

As another example, the transceiver unit 130 mounted on the metaverse bridge may transmit information about a specific converting engine among at least one converting engine to the first metaverse platform.

The input interface device 140 is configured to provide data to the processor 110.

The output interface device 150 is configured to output data from the processor 110.

Here, the output interface device 150 may be implemented as a display, microphone, speaker, etc., but is not limited thereto.

Components described in the exemplary embodiments of the present disclosure may be implemented by hardware elements. For example, The hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in the exemplary embodiments may be implemented as a combination of hardware and software.

The method according to an embodiment of the present disclosure may be implemented as a program that can be executed by a computer, and the computer program may be recorded in various recording media such as magnetic storage media, optical reading media, and digital storage media.

Various techniques described in this disclosure may be implemented as digital electronic circuits or computer hardware, firmware, software, or combinations thereof. The above techniques may be implemented as a computer program product, that is, a computer program or computer tangibly embodied in an information medium (e.g., machine-readable storage devices (e.g., computer-readable media) or data processing devices), a computer program implemented as a signal processed by a data processing device or propagated to operate a data processing device (e.g., a programmable processor, computer or multiple computers).

Computer program(s) may be written in any form of programming language, including compiled or interpreted languages. It may be distributed in any form, including stand-alone programs or modules, components, subroutines, or other units suitable for use in a computing environment. A computer program may be executed by a single computer or by a plurality of computers distributed at one or several sites and interconnected by a communication network.

Examples of information medium suitable for embodying computer program instructions and data may include semiconductor memory devices (e.g., magnetic media such as hard disks, floppy disks, and magnetic tapes), optical media such as compact disk read-only memory (CD-ROM), digital video disks (DVD), etc., magneto-optical media such as floptical disks, and ROM (Read Only Memory), RAM (Random Access Memory), flash memory, EPROM (Erasable Programmable ROM), EEPROM (Electrically Erasable Programmable ROM) and other known computer readable media. The processor and memory may be complemented or integrated by special purpose logic circuitry.

A processor may execute an operating system (OS) and one or more software applications running on the OS. The processor device may also access, store, manipulate, process and generate data in response to software execution. For simplicity, the processor device is described in the singular number, but those skilled in the art may understand that the processor device may include a plurality of processing elements and/or various types of processing elements. For example, a processor device may include a plurality of processors or a processor and a controller. Also, different processing structures may be configured, such as parallel processors. In addition, a computer-readable medium means any medium that can be accessed by a computer, and may include both a computer storage medium and a transmission medium.

Although this disclosure includes detailed descriptions of various detailed implementation examples, it should be understood that details describe features of specific exemplary embodiments, and are not intended to limit the scope of the invention or claims proposed in this disclosure.

Features individually described in exemplary embodiments in this disclosure may be implemented by a single exemplary embodiment. Conversely, various features that are described for a single exemplary embodiment in this disclosure may also be implemented by a combination or appropriate sub-combination of multiple exemplary embodiments. Further, in this disclosure, the features may operate in particular combinations, and may be described as if initially the combination were claimed. In some cases, one or more features may be excluded from a claimed combination, or a claimed combination may be modified in a sub-combination or modification of a sub-combination.

Similarly, although operations are described in a particular order in a drawing, it should not be understood that it is necessary to perform the operations in a particular order or order, or that all operations are required to be performed in order to obtain a desired result. Multitasking and parallel processing can be useful in certain cases. In addition, it should not be understood that various device components must be separated in all exemplary embodiments of the embodiments, and the above-described program components and devices may be packaged into a single software product or multiple software products.

Exemplary embodiments disclosed herein are illustrative only and are not intended to limit the scope of the disclosure. Those skilled in the art will recognize that various modifications may be made to the exemplary embodiments without departing from the spirit and scope of the claims and their equivalents.

Accordingly, it is intended that this disclosure include all other substitutions, modifications and variations falling within the scope of the following claims.

What is claimed is:

1. A method of controlling a interoperability architecture for the cross-platform metaverse, the method comprising:

receiving, by a first metaverse platform, first manifesto information of a second metaverse platform from a second metaverse platform;

identifying, by the first metaverse platform, interoperability between the first metaverse platform and the second metaverse platform based on second manifesto information of the first metaverse platform and the first manifesto information;

based on identifying that support of a metaverse bridge is needed for interoperability between the first metaverse platform and the second metaverse platform, transmitting, by the first metaverse platform, the first manifesto information and the second manifesto information to the metaverse bridge;

transmitting, by the metaverse bridge, third manifesto information related to a virtual bridge to the first metaverse platform;

establishing, by the first metaverse platform, a virtual bridge connection with the metaverse bridge and transmitting the first manifesto information and the third manifesto information to the second metaverse platform; and establishing, by the second metaverse platform, the virtual bridge connection with the metaverse bridge based on at least one of the first manifesto information and the third manifesto information.

2. The method of claim 1, wherein:

by the first metaverse platform, at least one function capable of direct connection between the first metaverse platform and the second metaverse platform and at least one function not capable of direct connection are identified, information related to the at least one function not capable of direction connection among the first manifesto information and the second manifesto information is transmitted to the metaverse bridge by the first metaverse platform, and information related to the at least one function capable of direct connection among the first manifesto information and the second manifesto information is transmitted from the first metaverse platform to the second metaverse platform, and a direct connection interface is established by the second metaverse platform based on information related to the at least one function capable of direct connection.

3. The method of claim 2, wherein:

the information related to at least one function not capable of direct connection is exchanged between the first metaverse platform and the second metaverse platform through the virtual bridge.

4. The method of claim 1, wherein:

the generating the virtual bridge comprises:

generating at least one converting engine for interconnection between the first metaverse platform and the second metaverse platform; and transmitting information on a specific converting engine among the at least one converting engine to the first metaverse platform.

5. The method of claim 4, wherein:

by the first metaverse platform, a first request signal requesting connection setup of the virtual bridge is transmitted to the metaverse bridge based on the information on the specific converting engine, and by the metaverse bridge, the third manifesto information is transmitted to the first metaverse platform according to the first request signal.

6. The method of claim 5, wherein:

the third manifesto information includes information on an address, connection method, and protocol required for the second metaverse platform to access the virtual bridge, and the information on the address, connection method, and protocol required to access the virtual bridge is encrypted based on a public key of the second metaverse platform.

7. The method of claim 6, wherein:

the establishing the virtual bridge connection with the metaverse bridge by the second metaverse platform comprises:

decrypting the information on the address, connection method, and protocol required to access the virtual bridge;

establishing the virtual bridge connection through the information on the address, connection method, and protocol required to access the decrypted virtual bridge; and receiving a virtual bridge connection setup result from the metaverse bridge.

8. The method of claim 1, wherein:

the first manifesto information includes at least one of information related to the second metaverse platform and information on at least one function supported by the second metaverse platform, the second manifesto information includes at least one of information related to the first metaverse platform and information about at least one function supported by the first metaverse platform, and the information on the at least one function supported by each of the first metaverse platform and the second metaverse platform includes protocols and authentication information related to the at least one function supported by each of the first metaverse platform and the second metaverse platform.

9. The method of claim 8, wherein:

the at least one function supported by each of the first metaverse platform and the second metaverse platform include at least one of an avatar-related function, an asset-related function, a content-related function, or an identity-related function.

10. A system that controls interoperability architecture for cross-platform metaverse, the system comprising:

a first metaverse platform;

a second metaverse platform; and a metaverse bridge, wherein the first metaverse platform is configured to:

receive first manifesto information of a second metaverse platform from a second metaverse platform;

identify interoperability between the first metaverse platform and the second metaverse platform based on second manifesto information of the first metaverse platform and the first manifesto information;

based on identifying that support of a metaverse bridge is needed for interoperability between the first metaverse platform and the second metaverse platform, transmit the first manifesto information and the second manifesto information to the metaverse bridge;

receive, from the metaverse bridge, third manifesto information related to a virtual bridge; and establish a virtual bridge connection with the metaverse bridge and transmit the first manifesto information and third information to the second metaverse platform, and wherein the second metaverse platform is configured to establish the virtual bridge connection with the metaverse bridge based on at least one of the first manifesto information and the third manifesto information.

11. The system of claim 10, wherein:

by the first metaverse platform, at least one function capable of direct connection between the first metaverse platform and the second metaverse platform and at least one function not capable of direct connection are identified, information related to the at least one function not capable of direction connection among the first manifesto information and the second manifesto information is transmitted to the metaverse bridge by the first metaverse platform, and information related to the at least one function capable of direct connection among the first manifesto information and the second manifesto information is transmitted from the first metaverse platform to the second metaverse platform, and a direct connection interface is established by the second metaverse platform based on information related to the at least one function capable of direct connection.

12. The system of claim 11, wherein:

the information related to at least one function not capable of direct connection is exchanged between the first metaverse platform and the second metaverse platform through the virtual bridge.

13. The system of claim 10, wherein:

the metaverse bridge is configured to:

generate at least one converting engine for interconnection between the first metaverse platform and the second metaverse platform; and transmit information on a specific converting engine among the at least one converting engine to the first metaverse platform.

14. The system of claim 10, wherein:

by the first metaverse platform, a first request signal requesting connection setup of the virtual bridge is transmitted to the metaverse bridge based on the information on the specific converting engine, and by the metaverse bridge, the third manifesto information is transmitted to the first metaverse platform according to the first request signal.

15. The system of claim 14, wherein:

the third manifesto information includes information on an address, connection method, and protocol required for the second metaverse platform to access the virtual bridge, and the information on the address, connection method, and protocol required to access the virtual bridge is encrypted based on a public key of the second metaverse platform.

16. The system of claim 15, wherein:

the second metaverse platform is configure to:

decrypt the information on the address, connection method, and protocol required to access the virtual bridge;

establish the virtual bridge connection through the information on the address, connection method, and protocol required to access the decrypted virtual bridge; and receive a virtual bridge connection setup result from the metaverse bridge.

17. The method of claim 10, wherein:

the first manifesto information includes at least one of information related to the second metaverse platform and information about at least one function supported by the second metaverse platform, the second manifesto information includes at least one of information related to the first metaverse platform and information about at least one function supported by the first metaverse platform, and the information about the at least one function supported by each of the first metaverse platform and the second metaverse platform includes protocols and authentication information related to the at least one function supported by each of the first metaverse platform and the second metaverse platform.

18. The system of claim 17, wherein:

the at least one function supported by each of the first metaverse platform and the second metaverse platform include at least one of an avatar-related function, an asset-related function, a content-related function, or an identity-related function.

19. A first metaverse platform included in a interoperability architecture for cross-platform metaverse, the first metaverse platform comprising:

at least one memory; and at least one processor, wherein the at least one processor is configured to:

receive first manifesto information of a second metaverse platform from a second metaverse platform;

identify interoperability between the first metaverse platform and the second metaverse platform based on second manifesto information of the first metaverse platform and the first manifesto information;

based on identifying that support of a metaverse bridge is needed for interoperability between the first metaverse platform and the second metaverse platform, transmit by the first metaverse platform, the first manifesto information and the second manifesto information to the metaverse bridge; and transmit, by the metaverse bridge, third manifesto information related to a virtual bridge to the first metaverse platform;

establish a virtual bridge connection with the metaverse bridge and transmit the first manifesto information and the third manifesto information to the second metaverse platform.

* * * * *